United States Patent
May et al.

(10) Patent No.: US 9,445,057 B2
(45) Date of Patent: Sep. 13, 2016

(54) VEHICLE VISION SYSTEM WITH DIRT DETECTION

(71) Applicant: MAGNA ELECTRONICS INC., Auburn Hills, MI (US)

(72) Inventors: Benjamin May, Lübs (DE); Uwe May, Lübs (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 277 days.

(21) Appl. No.: 14/183,613

(22) Filed: Feb. 19, 2014

(65) Prior Publication Data
US 2014/0232869 A1    Aug. 21, 2014

Related U.S. Application Data

(60) Provisional application No. 61/766,883, filed on Feb. 20, 2013.

(51) Int. Cl.
  *H04N 7/18*    (2006.01)
  *G06K 9/00*    (2006.01)
  *H04N 5/217*   (2011.01)

(52) U.S. Cl.
  CPC ............. *H04N 7/18* (2013.01); *H04N 5/2171* (2013.01)

(58) Field of Classification Search
  CPC ........................ H04N 5/3572; H04N 5/2171
  See application file for complete search history.

(56) References Cited

U.S. PATENT DOCUMENTS

| | | |
|---|---|---|
| 5,765,116 A | 6/1998 | Wilson-Jones et al. |
| 5,796,094 A | 8/1998 | Schofield et al. |
| 5,877,897 A | 3/1999 | Schofield et al. |
| 5,949,331 A | 9/1999 | Schofield et al. |
| 6,037,860 A | 3/2000 | Zander et al. |
| 6,037,975 A | 3/2000 | Aoyama |
| 6,049,171 A | 4/2000 | Stam et al. |
| 6,052,124 A | 4/2000 | Stein et al. |
| 6,057,754 A | 5/2000 | Kinoshita et al. |
| 6,291,906 B1 | 9/2001 | Marcus et al. |
| 6,292,752 B1 | 9/2001 | Franke et al. |
| 6,294,989 B1 | 9/2001 | Schofield et al. |

(Continued)

OTHER PUBLICATIONS

Achler et al., "Vehicle Wheel Detector using 2D Filter Banks," IEEE Intelligent Vehicles Symposium of Jun. 2004.

(Continued)

*Primary Examiner* — Dave Czekaj
*Assistant Examiner* — Tsion B Owens
(74) *Attorney, Agent, or Firm* — Gardner, Linn, Burkhart & Flory, LLP

(57) ABSTRACT

A vision system for a vehicle includes a camera disposed at a vehicle and having an image sensor and a lens. When the camera is disposed at the vehicle, the lens is exposed to the environment exterior the vehicle. The camera has an exterior field of view exterior the vehicle and is operable to capture image data representative of a scene occurring in the field of view of the camera. An image processor is operable to process multiple frames of image data captured by the camera, and wherein, responsive to processing multiple frames of captured image data, the image processor is operable to detect contaminants, such as water droplets or dirt, at the lens of the camera. Responsive to the image processor detecting contaminants at the lens of the camera, the vision system generates an alert and may trigger a function.

17 Claims, 7 Drawing Sheets

(56) References Cited

U.S. PATENT DOCUMENTS

| | | |
|---|---|---|
| 6,297,781 B1 | 10/2001 | Turnbull et al. |
| 6,302,545 B1 | 10/2001 | Schofield et al. |
| 6,310,611 B1 | 10/2001 | Caldwell |
| 6,311,119 B2 | 10/2001 | Sawamoto et al. |
| 6,315,421 B1 | 11/2001 | Apfelbeck et al. |
| 6,317,057 B1 | 11/2001 | Lee |
| 6,320,176 B1 | 11/2001 | Schofield et al. |
| 6,320,282 B1 | 11/2001 | Caldwell |
| 6,324,450 B1 | 11/2001 | Iwama |
| 6,333,759 B1 | 12/2001 | Mazzilli |
| 6,341,523 B2 | 1/2002 | Lynam |
| 6,353,392 B1 | 3/2002 | Schofield et al. |
| 6,362,729 B1 | 3/2002 | Hellmann et al. |
| 6,366,236 B1 | 4/2002 | Farmer et al. |
| 6,370,329 B1 | 4/2002 | Teuchert |
| 6,388,565 B1 | 5/2002 | Bernhard et al. |
| 6,388,580 B1 | 5/2002 | Graham |
| 6,411,204 B1 | 6/2002 | Bloomfield et al. |
| 6,411,328 B1 | 6/2002 | Franke et al. |
| 6,424,273 B1 | 7/2002 | Gutta et al. |
| 6,429,594 B1 | 8/2002 | Stam et al. |
| 6,430,303 B1 | 8/2002 | Naoi et al. |
| 6,433,817 B1 | 8/2002 | Guerra |
| 6,441,748 B1 | 8/2002 | Takagi et al. |
| 6,442,465 B2 | 8/2002 | Breed et al. |
| 6,469,739 B1 | 10/2002 | Bechtel et al. |
| 6,497,503 B1 | 12/2002 | Dassanayake et al. |
| 6,516,272 B2 | 2/2003 | Lin |
| 6,516,664 B2 | 2/2003 | Lynam |
| 6,523,964 B2 | 2/2003 | Schofield et al. |
| 6,553,130 B1 | 4/2003 | Lemelson et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,698 B2 | 7/2003 | Stam et al. |
| 6,594,583 B2 | 7/2003 | Ogura et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,680,792 B2 | 1/2004 | Miles |
| 6,681,163 B2 | 1/2004 | Stam et al. |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,728,393 B2 | 4/2004 | Stam et al. |
| 6,728,623 B2 | 4/2004 | Takenaga et al. |
| 6,735,506 B2 | 5/2004 | Breed et al. |
| 6,741,377 B2 | 5/2004 | Miles |
| 6,744,353 B2 | 6/2004 | Sjönell |
| 6,762,867 B2 | 7/2004 | Lippert et al. |
| 6,764,210 B2 | 7/2004 | Akiyama |
| 6,765,480 B2 | 7/2004 | Tseng |
| 6,784,828 B2 | 8/2004 | Delcheccolo et al. |
| 6,794,119 B2 | 9/2004 | Miles |
| 6,795,221 B1 | 9/2004 | Urey |
| 6,801,127 B2 | 10/2004 | Mizusawa |
| 6,801,244 B2 | 10/2004 | Takeda et al. |
| 6,802,617 B2 | 10/2004 | Schofield et al. |
| 6,807,287 B1 | 10/2004 | Hermans |
| 6,812,463 B2 | 11/2004 | Okada |
| 6,823,241 B2 | 11/2004 | Shirato et al. |
| 6,823,261 B2 | 11/2004 | Sekiguchi |
| 6,824,281 B2 | 11/2004 | Schofield et al. |
| 6,838,980 B2 | 1/2005 | Gloger et al. |
| 6,842,189 B2 | 1/2005 | Park |
| 6,853,897 B2 | 2/2005 | Stam et al. |
| 6,859,148 B2 | 2/2005 | Miller et al. |
| 6,861,809 B2 | 3/2005 | Stam |
| 6,873,253 B2 | 3/2005 | Veziris Spyros |
| 6,882,287 B2 | 4/2005 | Schofield |
| 6,888,447 B2 | 5/2005 | Hori et al. |
| 6,891,563 B2 | 5/2005 | Schofield et al. |
| 6,898,518 B2 | 5/2005 | Padmanabhan |
| 6,906,620 B2 | 6/2005 | Nakai et al. |
| 6,906,639 B2 | 6/2005 | Lemelson et al. |
| 6,909,753 B2 | 6/2005 | Meehan et al. |
| 6,914,521 B2 | 7/2005 | Rothkop |
| 6,932,669 B2 | 8/2005 | Lee et al. |
| 6,933,837 B2 | 8/2005 | Gunderson et al. |
| 6,940,423 B2 | 9/2005 | Takagi et al. |
| 6,946,978 B2 | 9/2005 | Schofield |
| 6,950,035 B2 | 9/2005 | Tanaka et al. |
| 6,953,253 B2 | 10/2005 | Schofield et al. |
| 6,959,994 B2 | 11/2005 | Fujikawa et al. |
| 6,961,178 B2 | 11/2005 | Sugino et al. |
| 6,967,569 B2 | 11/2005 | Weber et al. |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,606 B2 | 2/2006 | Schofield |
| 7,023,331 B2 | 4/2006 | Kodama |
| 7,030,738 B2 | 4/2006 | Ishii |
| 7,030,775 B2 | 4/2006 | Sekiguchi |
| 7,038,577 B2 | 5/2006 | Pawlicki et al. |
| 7,057,505 B2 | 6/2006 | Iwamoto |
| 7,057,681 B2 | 6/2006 | Hinata et al. |
| 7,062,300 B1 | 6/2006 | Kim |
| 7,065,432 B2 | 6/2006 | Moisel et al. |
| 7,068,289 B2 | 6/2006 | Satoh et al. |
| 7,085,633 B2 | 8/2006 | Nishira et al. |
| 7,085,637 B2 | 8/2006 | Breed et al. |
| 7,092,548 B2 | 8/2006 | Laumeyer et al. |
| 7,095,432 B2 | 8/2006 | Nakayama et al. |
| 7,106,213 B2 | 9/2006 | White |
| 7,110,021 B2 | 9/2006 | Nobori et al. |
| 7,113,867 B1 | 9/2006 | Stein |
| 7,116,246 B2 | 10/2006 | Winter et al. |
| 7,121,028 B2 | 10/2006 | Shoen et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,187,498 B2 | 3/2007 | Bengoechea et al. |
| 7,195,381 B2 | 3/2007 | Lynam et al. |
| 7,196,305 B2 | 3/2007 | Shaffer et al. |
| 7,205,904 B2 | 4/2007 | Schofield |
| 7,227,459 B2 | 6/2007 | Bos et al. |
| 7,227,611 B2 | 6/2007 | Hull et al. |
| 7,235,918 B2 | 6/2007 | McCullough et al. |
| 7,248,283 B2 | 7/2007 | Takagi et al. |
| 7,271,951 B2 | 9/2007 | Weber et al. |
| 7,304,661 B2 | 12/2007 | Ishikura |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,337,055 B2 | 2/2008 | Matsumoto et al. |
| 7,338,177 B2 | 3/2008 | Lynam |
| 7,355,524 B2 | 4/2008 | Schofield |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,420,756 B2 | 9/2008 | Lynam |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,429,998 B2 | 9/2008 | Kawauchi et al. |
| 7,432,967 B2 | 10/2008 | Bechtel et al. |
| 7,446,924 B2 | 11/2008 | Schofield et al. |
| 7,460,007 B2 | 12/2008 | Schofield et al. |
| 7,474,963 B2 | 1/2009 | Taylor et al. |
| 7,489,374 B2 | 2/2009 | Utsumi et al. |
| 7,495,719 B2 | 2/2009 | Adachi et al. |
| 7,525,604 B2 | 4/2009 | Xue |
| 7,526,103 B2 | 4/2009 | Schofield et al. |
| 7,541,743 B2 | 6/2009 | Salmeen et al. |
| 7,543,946 B2 | 6/2009 | Ockerse et al. |

(56) References Cited

U.S. PATENT DOCUMENTS

| | | |
|---|---|---|
| 7,545,429 B2 | 6/2009 | Travis |
| 7,548,291 B2 | 6/2009 | Lee et al. |
| 7,551,103 B2 | 6/2009 | Schofield |
| 7,561,181 B2 | 7/2009 | Schofield et al. |
| 7,565,006 B2 | 7/2009 | Stam et al. |
| 7,566,851 B2 | 7/2009 | Stein et al. |
| 7,567,291 B2 | 7/2009 | Bechtel et al. |
| 7,605,856 B2 | 10/2009 | Imoto |
| 7,609,857 B2 | 10/2009 | Franz |
| 7,613,327 B2 | 11/2009 | Stam et al. |
| 7,616,781 B2 | 11/2009 | Schofield et al. |
| 7,619,508 B2 | 11/2009 | Lynam et al. |
| 7,629,996 B2 | 12/2009 | Rademacher et al. |
| 7,639,149 B2 | 12/2009 | Katoh |
| 7,653,215 B2 | 1/2010 | Stam |
| 7,663,798 B2 | 2/2010 | Tonar et al. |
| 7,676,087 B2 | 3/2010 | Dhua et al. |
| 7,720,580 B2 | 5/2010 | Higgins-Luthman |
| 7,724,434 B2 | 5/2010 | Cross et al. |
| 7,731,403 B2 | 6/2010 | Lynam et al. |
| 7,742,864 B2 | 6/2010 | Sekiguchi |
| 7,786,898 B2 | 8/2010 | Stein et al. |
| 7,791,694 B2 | 9/2010 | Molsen et al. |
| 7,792,329 B2 | 9/2010 | Schofield et al. |
| 7,842,154 B2 | 11/2010 | Lynam |
| 7,843,451 B2 | 11/2010 | Lafon |
| 7,854,514 B2 | 12/2010 | Conner et al. |
| 7,855,778 B2 | 12/2010 | Yung et al. |
| 7,859,565 B2 | 12/2010 | Schofield et al. |
| 7,881,496 B2 | 2/2011 | Camilleri |
| 7,903,324 B2 | 3/2011 | Kobayashi et al. |
| 7,903,335 B2 | 3/2011 | Nieuwkerk et al. |
| 7,914,187 B2 | 3/2011 | Higgins-Luthman et al. |
| 7,930,160 B1 | 4/2011 | Hosagrahara et al. |
| 7,949,152 B2 | 5/2011 | Schofield et al. |
| 7,965,357 B2 | 6/2011 | Van De Witte et al. |
| 7,994,462 B2 | 8/2011 | Schofield et al. |
| 8,017,898 B2 | 9/2011 | Lu et al. |
| 8,027,691 B2 | 9/2011 | Bernas et al. |
| 8,064,643 B2 | 11/2011 | Stein et al. |
| 8,082,101 B2 | 12/2011 | Stein et al. |
| 8,090,153 B2 | 1/2012 | Schofield et al. |
| 8,095,310 B2 | 1/2012 | Taylor et al. |
| 8,098,142 B2 | 1/2012 | Schofield et al. |
| 8,120,652 B2 | 2/2012 | Bechtel et al. |
| 8,164,628 B2 | 4/2012 | Stein et al. |
| 8,184,159 B2 | 5/2012 | Luo |
| 8,203,440 B2 | 6/2012 | Schofield et al. |
| 8,224,031 B2 | 7/2012 | Saito |
| 8,233,045 B2 | 7/2012 | Luo et al. |
| 8,254,635 B2 | 8/2012 | Stein et al. |
| 8,289,430 B2 | 10/2012 | Bechtel et al. |
| 8,305,471 B2 | 11/2012 | Bechtel et al. |
| 8,308,325 B2 | 11/2012 | Takayanazi et al. |
| 8,314,689 B2 | 11/2012 | Schofield et al. |
| 8,339,526 B2 | 12/2012 | Minikey, Jr. et al. |
| 8,378,851 B2 | 2/2013 | Stein et al. |
| 8,405,726 B2 | 3/2013 | Schofield et al. |
| 8,452,055 B2 | 5/2013 | Stein et al. |
| 8,553,088 B2 | 10/2013 | Stein et al. |
| 9,288,381 B2 * | 3/2016 | Irie ............... H04N 5/2171 |
| 9,319,637 B2 * | 4/2016 | Lu ............... H04N 7/18 |
| 2005/0174567 A1 | 8/2005 | Hanna |
| 2007/0115357 A1 | 5/2007 | Stein et al. |
| 2007/0182528 A1 | 8/2007 | Breed et al. |
| 2008/0117079 A1 * | 5/2008 | Hassan ............... B60R 25/045 |
| | | 340/901 |
| 2008/0129541 A1 * | 6/2008 | Lu ............... G06K 9/00791 |
| | | 340/905 |
| 2009/0208058 A1 * | 8/2009 | Schofield ............... G06K 9/00818 |
| | | 382/103 |
| 2009/0278950 A1 | 11/2009 | Deng |
| 2011/0080494 A1 * | 4/2011 | Mori ............... H04N 5/2171 |
| | | 348/222.1 |
| 2012/0013708 A1 * | 1/2012 | Okubo ............... H04N 13/0018 |
| | | 348/43 |
| 2012/0162427 A1 | 6/2012 | Lynam |
| 2013/0219742 A1 * | 8/2013 | Field ............... B60S 1/0848 |
| | | 34/491 |
| 2013/0300869 A1 | 11/2013 | Lu et al. |
| 2014/0060582 A1 * | 3/2014 | Hartranft ............... B05B 1/06 |
| | | 134/18 |
| 2014/0104426 A1 | 4/2014 | Boegel et al. |

OTHER PUBLICATIONS

Bow, Sing T., "Pattern Recognition and Image Preprocessing (Signal Processing and Communications)", CRC Press, Jan. 15, 2002, pp. 557-559.

Broggi et al., "Automatic Vehicle Guidance: The Experience of the ARGO Vehicle", World Scientific Publishing Co., 1999.

Broggi et al., "Multi-Resolution Vehicle Detection using Artificial Vision," IEEE Intelligent Vehicles Symposium of Jun. 2004.

Kastrinaki et al., "A survey of video processing techniques for traffic applications".

Sun et al., "On-road vehicle detection using optical sensors: a review".

* cited by examiner

VEHICLE VISION SYSTEM WITH DIRT DETECTION

CROSS REFERENCE TO RELATED APPLICATION

The present application claims the filing benefits of U.S. provisional application Ser. No. 61/766,883, filed Feb. 20, 2013, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data that may be displayed or processed to provide the desired display images and/or processing and control, depending on the particular application of the camera and vision or imaging system.

The present invention provides a vision system that is operable to detect light and dark spots in captured image data and is operable to determine when such spots are indicative of dirt or water droplets or the like at the lens of the camera. The vision system determines such dirt spots via processing multiple frames of video image data. Optionally, the vision system may process image data captured by two cameras at the vehicle with overlapping fields of view, and responsive to detection of one or more spots (at the overlapping regions) in one of the camera's image data and not in the other camera's image data, the vision system determines that the detected spot or spots are indicative of dirt at the lens of the one camera.

According to an aspect of the present invention, the vision system comprises a camera disposed at a vehicle, with the camera comprising an image sensor and a lens, and when the camera is disposed at the vehicle, the lens is exposed to the environment exterior the vehicle. The camera has an exterior field of view exterior the vehicle and is operable to capture image data representative of a scene occurring in the field of view of the camera. An image processor is operable to process multiple frames of image data captured by the camera. The image processor is operable to process captured image data to detect blobs in captured image data. Responsive to processing multiple frames of captured image data, the image processor is operable to determine if detected blobs are contaminants at the lens of the camera. Responsive to processing a first frame of captured image data, and responsive to the image processor determining a first threshold likelihood that a detected blob is indicative of a contaminant, the image processor adjusts processing of captured image data when processing a second or subsequent frame (such as a frame that immediately follows the first frame or is several frames following the first frame) of captured image data. Responsive to the image processor determining a second threshold likelihood that the detected blob is indicative of a contaminant when processing the subsequent frame of captured image data, the image processor determines that the detected blob is a contaminant at the lens of the camera. Responsive to the image processor determining that the detected blob is a contaminant at the lens, the vision system generates an alert.

These and other objects, advantages, purposes and features of the present invention will become apparent upon review of the following specification in conjunction with the drawings.

DESCRIPTION OF THE PREFERRED EMBODIMENTS

A driver assist system and/or vision system and/or object detection system and/or alert system may operate to capture images exterior of the vehicle and process the captured image data to detect objects at or near the vehicle and in the predicted path of the vehicle, such as to assist a driver of the vehicle in maneuvering the vehicle in a rearward direction. The object detection may utilize detection and analysis of moving vectors representative of objects detected in the field of view of the vehicle camera, in order to determine which detected objects are objects of interest to the driver of the vehicle, such as when the driver of the vehicle undertakes a reversing maneuver.

Figure 1:
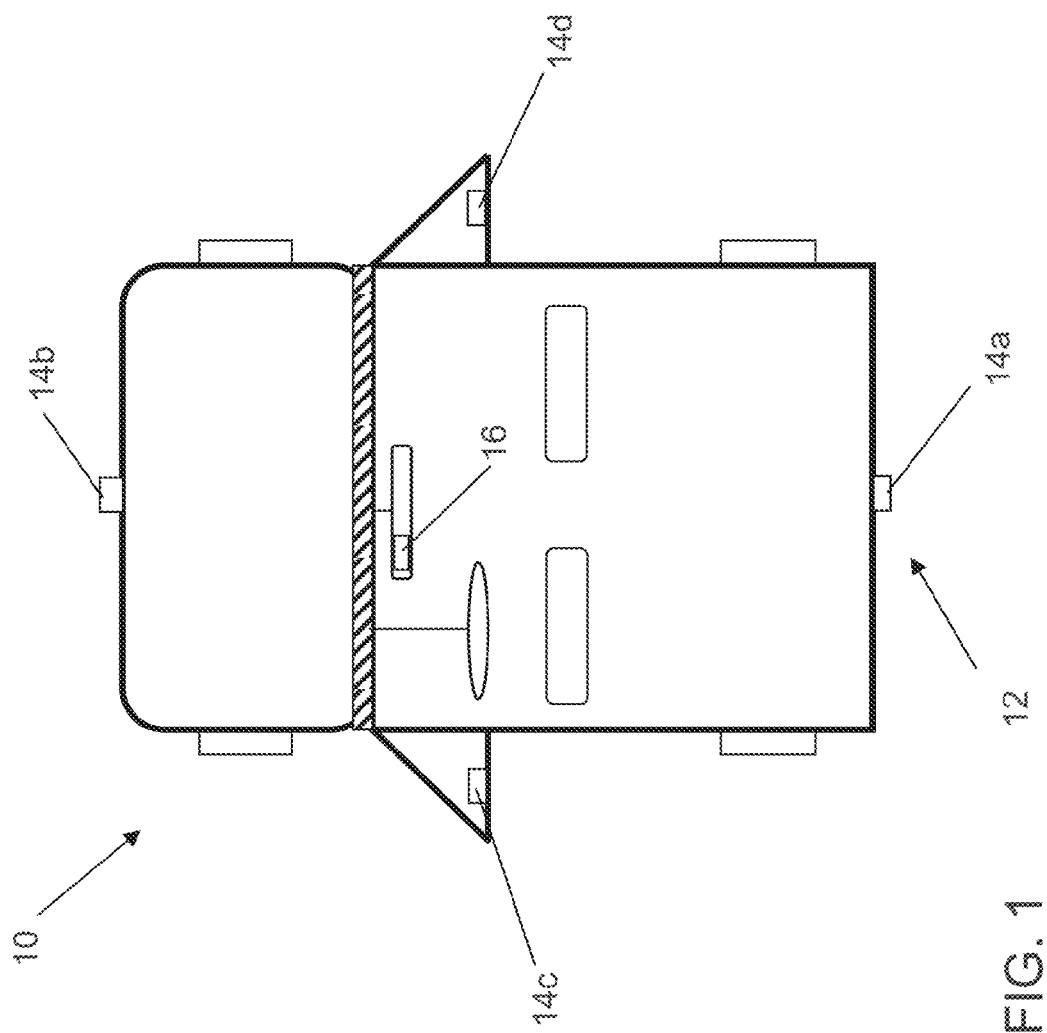
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at the front (or at the windshield) of the vehicle, and/or a sidewardly/rearwardly facing camera 14c, 14b at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

Thus, one or more vehicle-based cameras thus may capture images for a vehicle vision system or driver assistant system or the like. Vehicle driver assistant systems today often include and employ optical cameras placed either inside of the vehicle cabin or compartment (and directed to view through the side windows, the rear window(s) and/or the windshield or front window, and such inside cameras may be integrated into the compartment rearview mirror structure or a windshield electronics module or the like) or outside of the vehicle (with such exterior cameras often integrated into the front grill, the headlights and/or rear taillights and/or the side exterior rearview mirrors (such as described in U.S. provisional application Ser. No. 61/837, 955, filed Jun. 21, 2013, which is hereby incorporated herein by reference in its entirety) and/or the rear trunk lid handle structure or the like, as described in U.S. patent application Ser. No. 14/102,980, filed Dec. 11, 2013, which is hereby incorporated herein by reference in its entirety). With such exterior cameras, they are often configured such that only the camera optic outer lens is exposed to the environment.

The images or image data or video images or movies (or moving images or video) captured by and/or output by the vehicle vision cameras (both for human vision, such as display of video images at the display to assist the driver in maneuvering the vehicle, such as during a backup maneuver of the vehicle or the like, as well as for machine vision, such as for use in object detection, or such as for detecting the pivot angle of a hooked on trailer (such as described in U.S. provisional application Ser. No. 61/935,485, filed Feb. 4, 2014, which is hereby incorporated herein by reference in its entirety), or such as event recording systems (such as described in U.S. patent application Ser. No. 14/169,329, filed Jan. 31, 2014, which is hereby incorporated herein by reference in its entirety), or such as power hatch anti-collision control systems (such as described in U.S. patent application Ser. No. 14/159,772, filed Jan. 21, 2014, which is hereby incorporated herein by reference in its entirety) or the like) may be negatively impaired by mist or dirt at the lens of the camera. The images captured by such cameras may appear unpleasing to the human eye and details may be inconceivably blurred or hidden. Also, machine vision algorithms, such as object detection algorithms and/or tracking algorithms and/or the like, may be distracted by blurred, unreal or hidden structures caused by dirt on one or more camera lens. As used herein, "dirt" may comprise any element that may at least in part impair or obstruct the view of the camera, such as dirt, mud, dust, clear or impure water drops, hail or snow or ice or the like.

Optionally, the vision system may include a means for clearing the vehicle vision camera lens of pollution, such as by directing (clean) air streams in a way that no polluted air can reach the lens surface, such as by utilizing aspects of the systems described in U.S. patent application Ser. No. 14/052,945, filed Oct. 14, 2013, which is hereby incorporated herein by reference in its entirety. As a redundancy to a system with pollution prevention via a directed (clean) air stream, or as an alternative to such a system, the present invention provides a vision system or imaging system for a vehicle that utilizes an algorithm to detect dirt and that may provide an alert or warning, warning (or confidence) level or parameter to the driver or to the image processing control, and that is operable to have the image processing algorithm lower or compensate the impairment of dirt on the vision system's camera lenses. Optionally, the dirt detection system, responsive to detection of dirt at the camera or lens, may trigger a desired function, such as starting a window defroster or starting a camera cleaning cycle, or may be used in combination or as a replacement for a vehicle rain sensor (such as in use in vehicles for triggering the windshield wipers automatically).

The present invention provides a dirt detection or contaminant detection software solution running on a computation unit or processor that is connected to a digital camera of the vehicle or that processes image data output from a digital camera of the vehicle. In this environment the dirt detection system tries to recognize dirty locations on the camera lens. If the dirt detection system identifies such locations at a more or less reliable level, the software or system is operable to generate an alert or warning, such as a visual or optical alert or warning and/or an audible or acoustical alert or warning to the user.

Dirt detection in video images is difficult due to the multi-dimensional information that is contained in frames of video images. A single frame (a two-dimensional bitmap) may contain millions of pixels with millions of possible colors, and in a movie clip or video file environment a timeline is added to this. The information of each pixel can increase, vanish or move in any direction from frame to frame.

The human recognition system is able to recognize dirt at the lens without any difficulties. However, machine vision image processing may interpret dirt at a lens of a camera as an object in the field of view of the camera.

There have been dirt detection solutions for still images in digital camera still image outputs. These solutions provide a model-based dirt location recognition. This means that there is a set of definitions of how a dirt location looks and then this is run over the image to make more or less fine comparisons between this definition and the neighborhood of a single pixel or group of pixels. If the system comprises a multi-million pixel sensor chip or camera and a high-speed digital signal processor (DSP), this can lead to professional results.

However, such a system is not suitable for video image systems. With machine vision image processing, beginning at the moment where a single dirt location arises at the lens of a camera, any vision system may lead to wrong results and potential problems if the system does not detect the presence of the dirt at the lens. Thus, a dirt detection solution may be a very helpful add-on for many video camera related tasks.

Recognizing dirt on a lens of a digital camera thus can provide enhanced image processing of image data captured by a vehicle camera. The present invention processes image data of consecutive frames of captured images while the vehicle is moving and, if there is something in the image that looks different than the image neighborhood, but is constant in position and size over the time (in other words, constant between frames of captured image data), then the system may determine that the detected item or "object" or "blob" is indicative of dirt or the like at the lens of the camera.

A blob captured in image data can arise from the presence of a contaminant, such as dirt or a raindrop or snow or a similar extraneous item, present either at the outer surface of a transparent cover at the camera or at the outer surface of the outermost lens element of the camera. Such blobs thus comprise foreign or extraneous material that locally obscure and/or distort image information that is being captured or received at that local lens region or regions, and thus is captured as blob image data that lacks usable or reliable information about the real world scene exterior of the equipped vehicle and in the field of view of the camera.

The blobs or dirty or obscured locations on the lens of a digital camera arise in two principle ways, as "dark" dirt locations and "light" or "bright" dirt locations.

Figure 2:
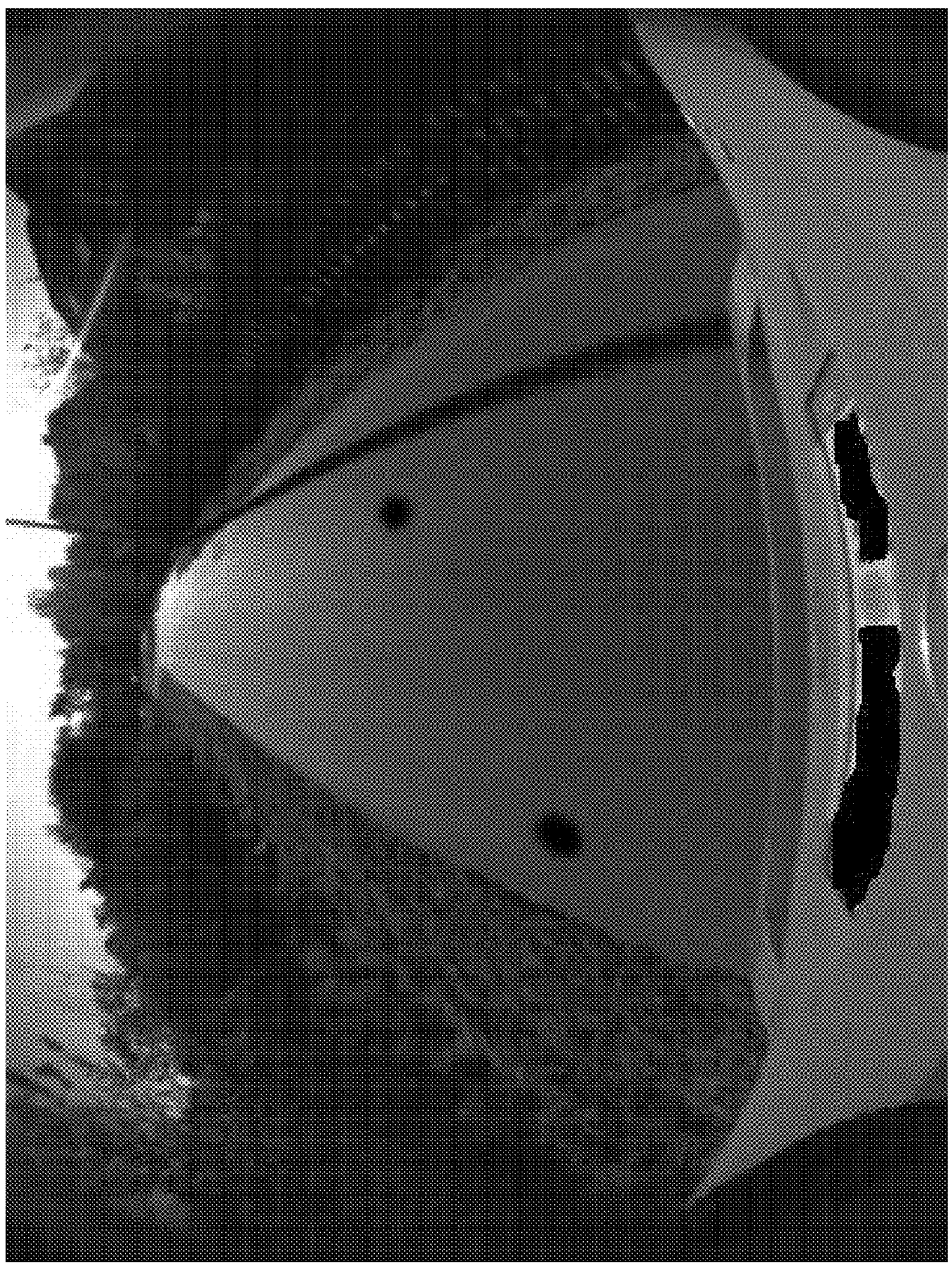
FIG. 2 is an image as captured by a rearward viewing camera of a vehicle, with dirt at the lens of the camera shown as dark spots in the captured image.
Figure 3:
FIG. 3 is an image as captured by a rearward viewing camera of a vehicle, with dirt at the lens of the camera shown as light spots in the captured image.
Figure 4:
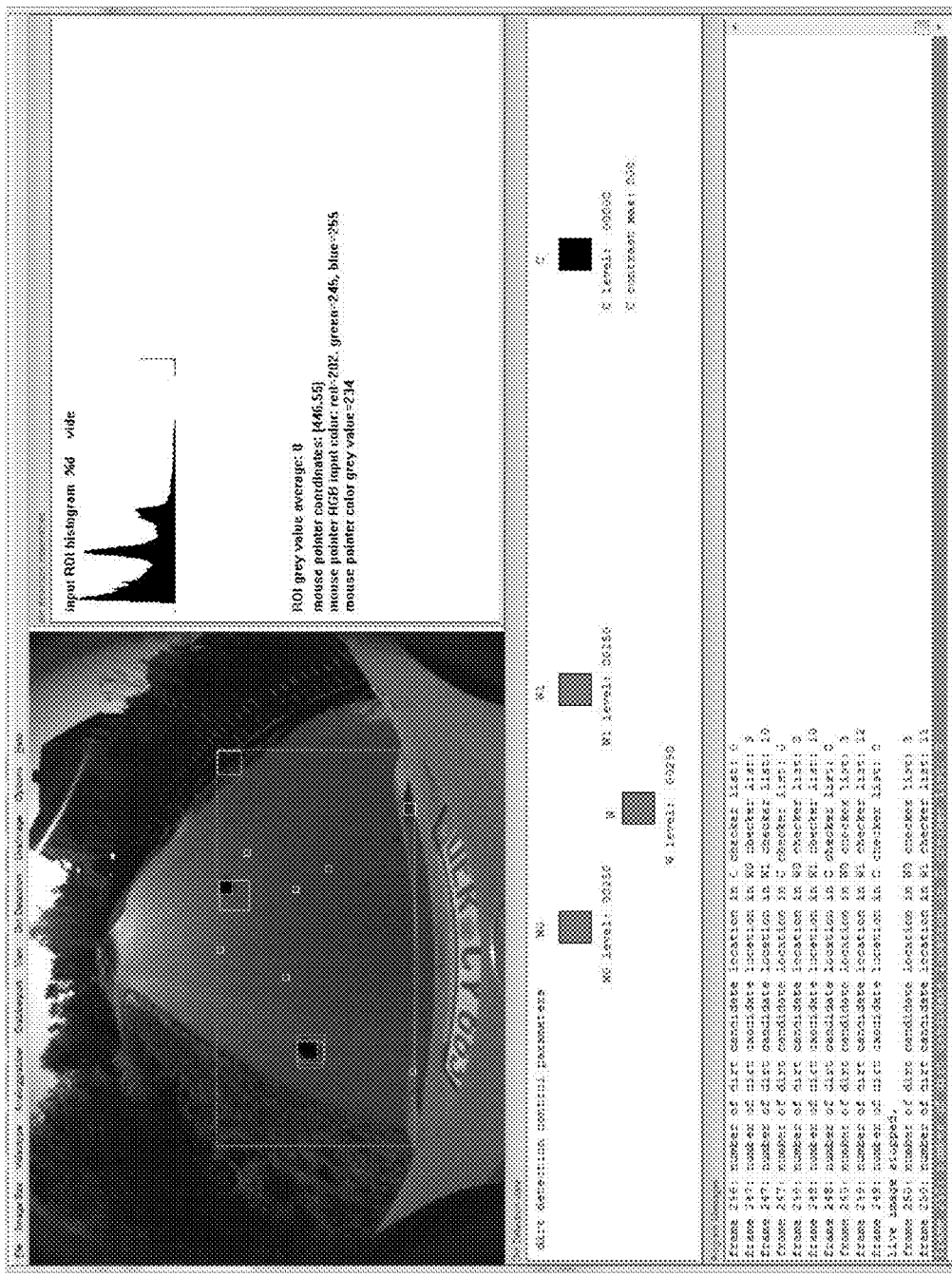
FIG. 4 is an image showing application of the dirt detection system of the present invention to the captured images.
Figure 5:
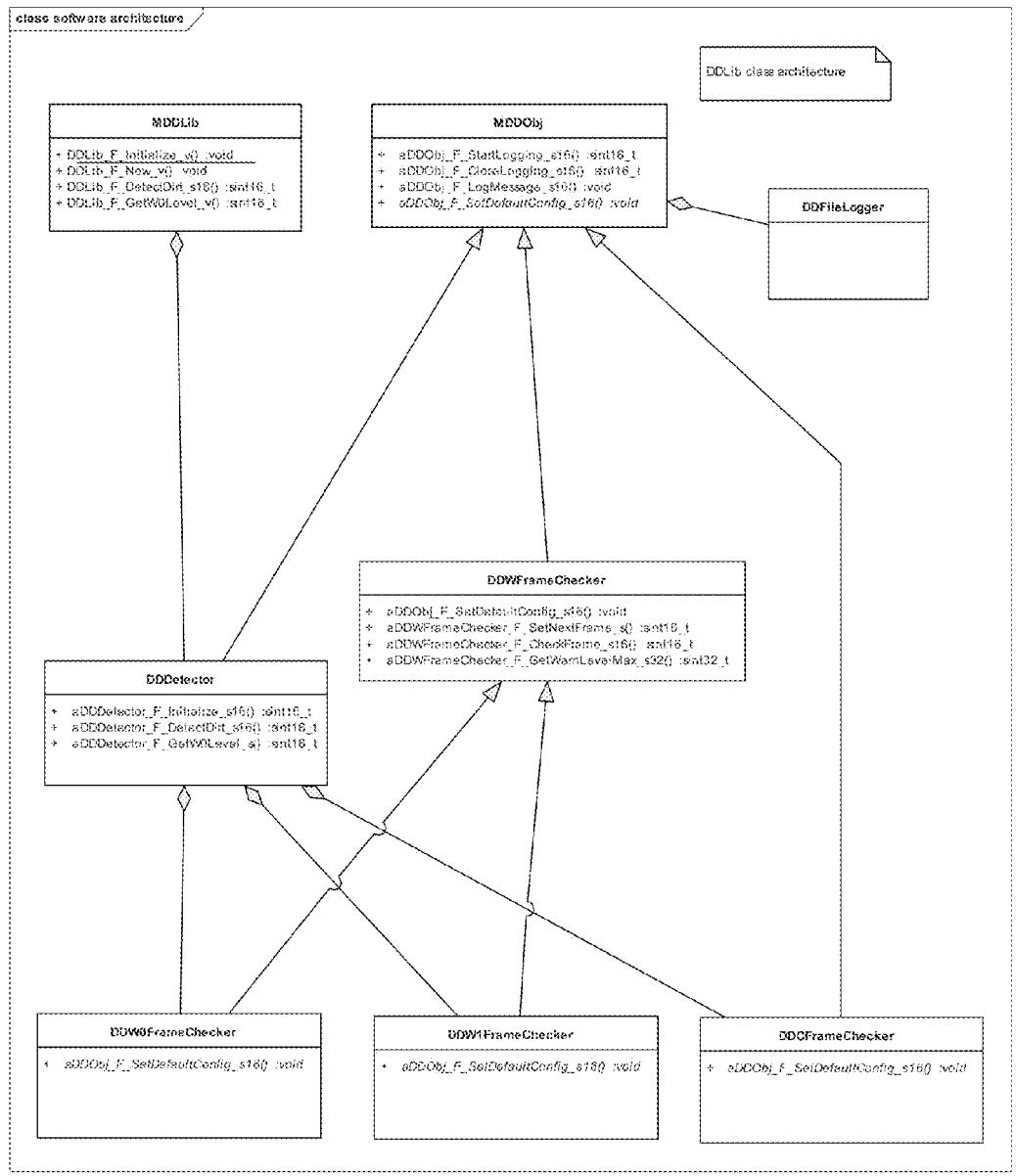
FIG. 5 is a chart showing the software architecture for the dirt detection system of the present invention.

Dark dirt locations can be identified at the digital image as dark regions (see, for example, FIG. 2). The practical background of these dark dirt locations comes from color drops, from small pieces of wet earth or dirt or mud and other substances that are at least substantially non-light-transmitting, such that light cannot shine through. Typically, there may be more or less round dark blobs at the lens in such situations, but, for example, using a SUV in an outdoor region or any vehicle in an agricultural environment, there likely would be more free-formed blobs with larger dimensions. From the optical point of view the objects on the lens must have a minimal radius. Otherwise, the optical diffraction at the edge of the object transports a visible amount of brightness into the interior of the image of this object and what is seen is not a dark region but a region with decreasing contrast with respect to the neighborhood of this region (discussed below).

The way to identify such dark blobs is relatively straight forward. The system may identify all dark blobs (a blob is a convex, connected region of dark pixels in a digital image) and save them in a list. In the next frame the system may do the same thing and thus acquires an impression or determination of which blob is constant over time or consecutive frames of captured image data.

Another approach leads to a similar result. The system may look not at the input frame but at the difference image of two input frames. A dark region in the difference image is a region that gets minimal modifications from frame to frame. Using the same blob building methods like in the first case the system can get a second statement about detected blobs that may be indicative of dirt on the lens of the camera.

Recognizing dark dirt locations is a short time image processing task. The detection algorithms should lead to a valid result after some hundred frames. There is nothing to be stored in the memory and loaded during the next run of dark dirt detection.

As discussed above, the system may see or encounter dirt locations in the image that are not a result of opaque objects on the lens. These locations may be due to drops of clean water or the like at the camera lens. Their image on the sensor is influenced from refraction and dispersion. However, it is also possible that there may be one or more opaque objects with a very small radius on the lens. This leads to the same result using another way of light—optical diffraction and the edge of the object.

The optical result in both cases is the same. The normal image of the reality at the sensor will be modified, sharpness (local contrast) will go back, color space will be reduced to a tube neighborhood of the spatial diagonal in color space.

These descriptions lead to the system for finding bright dirt locations in a digital movie or video image clip or data file. The system processes the incoming frames and controls the contrast maximum for each pixel in every frame. This maximum value is stored in a pixel based database over the time. The process waits a couple of frames to find a large contrast in every pixel of the image. This large contrast may come from a dark shadow moving over the image, from a pedestrian or a moving vehicle in the field of view of the camera, a light source in front of a dark region and/or many other things outside the vehicle and in the field of view of the camera. After a couple of frames, the system checks the database with respect to a contrast minimum value and builds blobs on this base. The results are dirt location candidates or possibilities.

Different from the situation in the dark dirt location case, the contrast based recognition of bright dirt locations is based on a long time strategy. It is possible that environment conditions do not allow a valid recognition result after thousands of frames. So the system stores bright dirt location candidates after one run of the dirt detection system in memory and reloads them for the next one.

The present invention thus provides a dirt or contaminant detection system that is operable to process multiple frames of image data to determine if blobs detected in the captured image data are indicative of or representative of dirt or the like at the lens (or cover) of the camera. The vision system includes a camera disposed at a vehicle equipped with the vision system. The camera comprises an image sensor and a lens, and, when the camera is disposed at the equipped vehicle, the lens is exposed to the environment exterior the equipped vehicle. The camera has an exterior field of view exterior the equipped vehicle and is operable to capture image data representative of a scene occurring in the field of view of the camera. An image processor is operable to process multiple frames of image data captured by the camera to detect blobs in captured image data. Responsive to processing detected blob data over multiple frames of captured image data, the image processor is operable to determine if detected blobs are representative of contaminants at the lens of the camera. Responsive to processing a first frame of captured image data, and responsive to the image processor determining a first threshold likelihood that a detected blob is indicative of a contaminant (such as when the system determines that the detected blob is likely a contaminant with a confidence level of greater than, for example, 80 percent or greater than, for example, 90 percent or the like), the image processor adjusts processing of detected blob data when processing a subsequent frame of captured image data. Responsive to the image processor determining a second threshold likelihood that the detected blob is indicative of a contaminant when processing detected blob data of the subsequent frame or frames of captured image data (such as when the system determines that the detected blob is likely a contaminant with a confidence level of greater than, for example, 80 percent or greater than, for example, 90 percent or greater than, for example, 95 percent or the like), the image processor determines that the detected blob is representative of a contaminant at the lens of the camera. Responsive to the image processor determining that the detected blob is representative of a contaminant at the lens, the vision system may generate an alert and/or may control a function or accessory of the vehicle.

Thus, the present invention processes captured image data over multiple frames to first determine that a detected blob may be due to dirt or contaminants at the camera lens, and then to further determine or confirm that the detected blob is due to dirt or contaminants at the camera lens. The second threshold likelihood or probability may be greater than the first threshold likelihood or probability or may be generally the same, and will provide enhanced determination or confirmation that the detected blob is due to contaminants. The image processing of the subsequent frame or frames of image data may focus on the blob data of the blobs detected via the image processing of the first frame or frames of image data (and the subsequent frame may be processed differently in response to a detection of a blob in the first frame that may be indicative of contaminants at the lens) to confirm that there is dirt at the camera lens. The present invention thus provides enhanced detection of dirt or contaminants at the camera lens while also providing reduced false positives (where the system may determine that a detected blob is due to contaminants when it is not).

Movie Clip Based Development

Movie clip or video based development is the first part of the dirt detection software development. The dirt detection system uses a movie database under laboratory conditions to design and implement the basic software flow for dirt detection.

The typical way to produce video clips is to first find an environment at which to make a movie clip. Then some camera parameters can be set and the first clip can be produced without any dirt on the lens. Note that the way of a moving camera in the space of extrinsic camera parameters is an element of camera parameters that should be fixed. This is typically done by the way and the speed of a vehicle with a rear viewing camera. Then, in a second step, some kind of dirt is applied to the lens, and the same camera parameters are used to make a second movie clip. This kind of clip generation enables the system to evaluate dirt detection algorithm from two sides: at the first side the system has to recognize dirt blobs (and dirt blobs only) on the clip with dirt location, and at the other side the system does not find anything in the video clip without dirt locations.

In the early part of the first section it makes sense to produce dirt on the lens with some artificial dirt on a clean movie clip using software solutions like Adobe After Effects®. As discussed below, there will have a complex timeline and subwindow scheduling to recognize dirt locations at the lens in real camera systems using millions of pixels. So real time operation on the whole input image is not a typical requirement for the dirt detection system. In the early development phase, a reduced input frame size of about 640×480 pixels may be used to speed up testing and algorithm evaluation. Furthermore, this approach leads to a GUI with a complete input frame and some more windows with parameters and log messages at the same display.

Camera Based Development

The second section of the development process deals with cameras on vehicles. The dirt detection system of the present invention is operable to:

Fulfill real time conditions on the target system;
Use real camera image size and color space;
Generate usable warnings to the user; and
Interact with other software modules.

Real Time Conditions

The dirt detection algorithm comprises a pixel based image processing algorithm applied on input images and on some more images derived from input frames, such as difference images and contrast maximum images. The system may subdivide the input frame in an array of overlapping subwindows and proceed with dirt detection on a single subwindow up to a valid recognition statement and then go to the next subwindow. The subwindows are small enough to allow real time dirt detection in a 25 frames per second (fps) or 30 fps video environment. However, the subwindows have to be large enough to contain dirt locations of typical sizes. The system must realize overlapping regions large enough to make certain that no dirt locations will be ignored by the algorithms along the edge of a subwindow.

Generation of Warnings

The generation of warnings should be made when dirt is detected, but false alerts or warnings should be avoided. Thus, the system should generate a warning whenever a dirt location can be recognized, but should not generate a warning in the case of clean lenses. From the user's point of view, this can be called the sensitivity of the dirt detection software system.

The software development establishes a set of algorithms to identify dirt locations. Applying them on an input video stream, the output results are warning levels for the algorithms. The way to realize a sensitivity level of dirt detection visible by the user is to combine these warning levels to a single output signal. This may be done based on a complex decision strategy discussed below. The decision strategy has one general background rule and that is that it is better to ignore some light weight dirt locations than to produce an endless stream of warnings.

Interaction with Other Software Modules

With respect to the real time requirement and the complexity of algorithms, the best way to use dirt detection on a video stream may be an isolated usage without any interaction with other software modules. This leads to the assumption that dirt detection will not run together with an output image producing software module like a surround view or a rear viewing system. In other words, the dirt detection algorithm may operate during machine vision processing of captured image data, but not during times when the captured image data is used for displaying captured images for view by the driver of the vehicle, such as during a reversing maneuver or the like. The idea is that the dirt detection system or algorithm is running if the user does not need a camera image, the output display is (with respect to the video stream) down and the DSP is on idle. At this point the scheduling system discussed above can select the current subwindow and start dirt detection for a couple of minutes.

Software Structure and Development

The development process uses different software modules. Under laboratory conditions a dirt detection related development tool may be developed (herein referred to as the DDTool). This tool gives a GUI to the user with the idea to load single movie clips or scheduled movie clips from a database, control the complete set of dirt detection parameters, apply dirt detection to the movie clips and control output values and generate warnings.

The heart of the dirt detection will be located in a library. This library is connected to the DDTool.

A preferred programming environment is Microsoft Visual Studio, such as the 2008 release in the professional version. No untypical APIs or Add-Ins are required, but the system may use the Microsoft multimedia API to deal with AVI movies. Any code may be written in C/C++, in the DDTool there is C and extensive usage of Microsoft Windows SDK.

Software Architecture

In this section the software architecture of DDLib is described. Note that this architecture may be used in the same way on any implementation of the software on a target platform.

A C-based interface to any calling application is referred to herein as DDLib. The functions in DDLib are set and get functions only and call the detection procedure in other modules. The main configuration data set in DDLib are input frame dimensions, region of interest (ROI) subwindow and activation data for checker submodules. The most important results obtained from DDLib are warning levels of the checker modules. During development process further geometric and dirt recognition related data may be obtained for any dirt location candidate found in some checker module.

The dirt detection system includes a DDDetector class. Checker modules are used for dark and bright blob detection. These checker modules are derived from the DDW-FrameChecker base class, all classes in DDLib are derived from DDObj which supports some very basic operations like configuration and logging. The final checker module classes DDW0FrameChecker (for dark dirt locations using video input frame), DDW1FrameChecker (for dark dirt locations using difference image between frames), and DDCFrameChecker (for bright dirt locations using contrast maximum image) implement several virtual functions from their parent classes to realize a polymorphic system of checker modules.

Therefore, the present invention provides a dynamic dirt detection system for detecting dirt on a vehicle camera lens via processing of streams of digital images. The algorithms used in the dirt detection system of the present invention include the combination of object recognition and tracking in different input images built up from the original input frame. These images are the difference image, taken to a frame with n-frame distance to the current frame, the contrast maximum image and the color space diagonal distance image. Putting all observations of these investigations together, the system is able to generate a valid warning of dirt detected at the lens and to avoid warning errors at the same time.

In many industrial and private environments there are camera solutions that fulfill measurement or surveillance tasks today. The common condition related to dirt detection for all these system is that there is a well defined view of these cameras in a known environment with typical kind of light and darkness based on a time scheduling, with typical objects the cameras see, and with typical settings depending on the incoming light. Thus, a special dirt detection system with a minimum of learning and a complex set of fixed parameters may be implemented for such camera systems.

In practical terms this leads to a dirt detection system that will be deployed in a configuration state ready to use. This includes fixed scheduling for application intervals and length for dirt detection, fixed thresholds for blob detection and fixed periods for warning or alert level generation. The user will install the camera system including dirt detection, turn the dirt detection feature on and will get a warning if there is any detected dirt or blocking element or the like at the lens.

Optionally, aspects of the present invention may be suitable for use in a mobile context such as with camcorders or camera systems mounted at vehicles, where there may not be a predictable environment. For example, a mobile camera sold to a user for use in a snow covered environment may view snow fields anytime it is used, while a mobile camera mounted at a fork lift truck in a storage building may not see the daylight anytime. Thus, a dirt detection system with fixed parameters may not be suitable for such a mobile system without learning the environment of the user. Thus, the dirt detection system of the present invention may always include a learning behavior in a complex scheduling of time intervals and subimages, such as discussed above.

Figure 6:
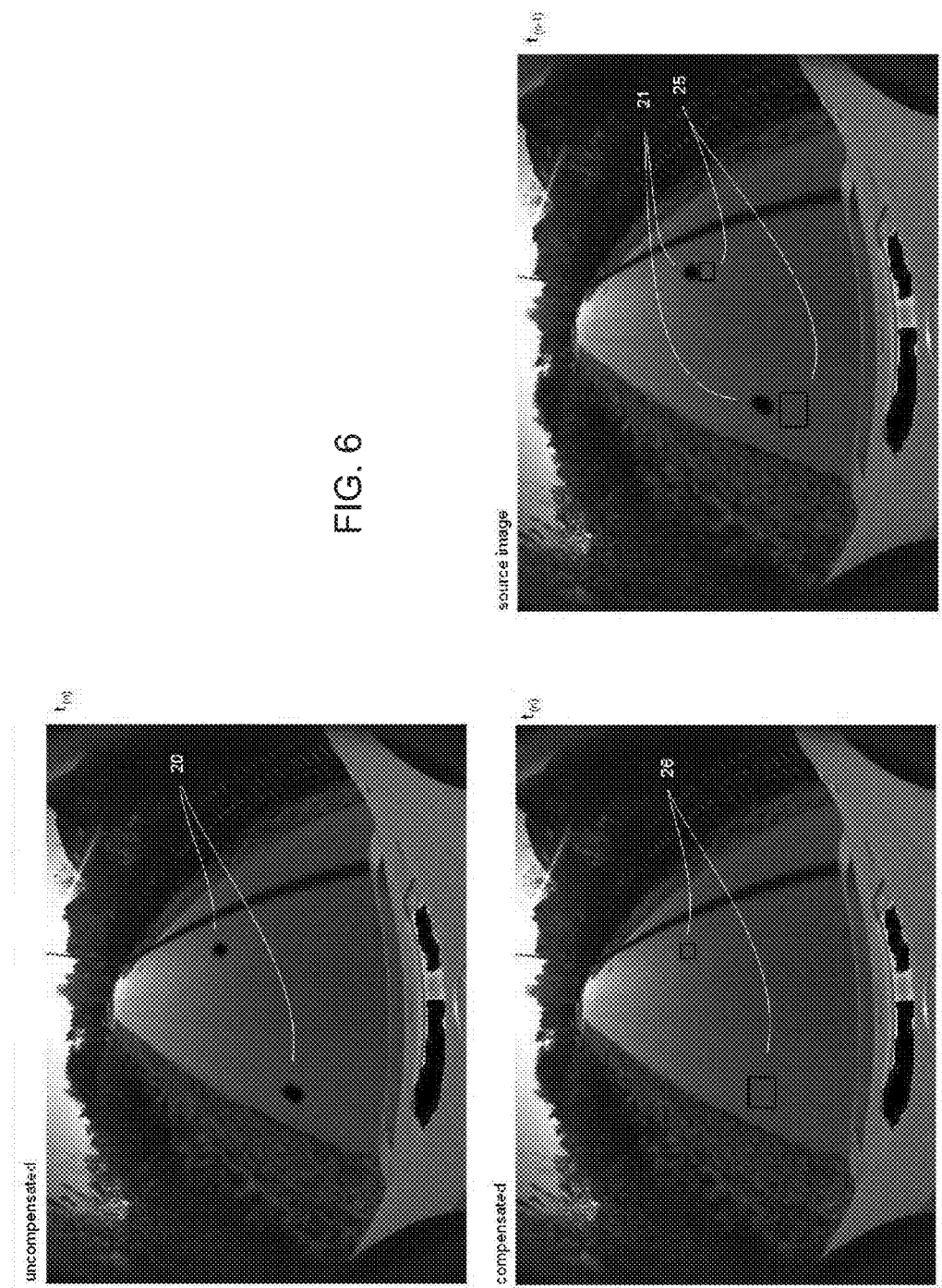
FIG. 6 is an example of the dirt detection system detecting dirt in captured images and masking the dirt in accordance with the present invention.

Once dirt spots on one camera are identified and localized, the dirt impairment compensation algorithm may be employed. Here, the nature of the vision flow due to the vehicle's own movement can be used for benefit. The video images' motion flow is dependent on the vehicle's own motion speed and direction. For a rear viewing camera, the scene motion is toward the vanishing point at the horizon when the vehicle is moving forward, while for a front viewing camera, the scene motion is coming from the vanishing point at the horizon and towards the camera. The scene motion is bent as soon the vehicle maneuvers through a curve or is driven uphill or downhill. Suitable fractions may be cropped from previous images, shrunk, turned and distorted according to the projection plane (known motion compensation) to be blended over one or accordingly several regions identified to be statically covered by a blob of dirt by the dirt detection algorithm earlier. An example is shown in FIG. 6, where a fraction 25 of the source image taken earlier (tn−1) than the currently processed image (tn) becomes superimposed to the spots 26 covered by (identified) dirt blobs 20 in the compensated output image. The same dirt blobs 20 cover other areas in the source image (tn−1) than these 20 at image (tn).

The blob covering fraction may be continuously shifted forward toward the vanishing point (such as for a rear viewing camera) or continuously shifted rearward from the vanishing point (such as for a front viewing camera) according to the optical flow until it disappears from the dirt blob's zone. The blobs may blend in part by successive covering blobs. For the human eye this compensation may look pleasing, and machine vision algorithms may be less distracted by this algorithm, but the dirt blob covering area does not meet the demand for being real time since the covering fraction is stored.

Figure 7:
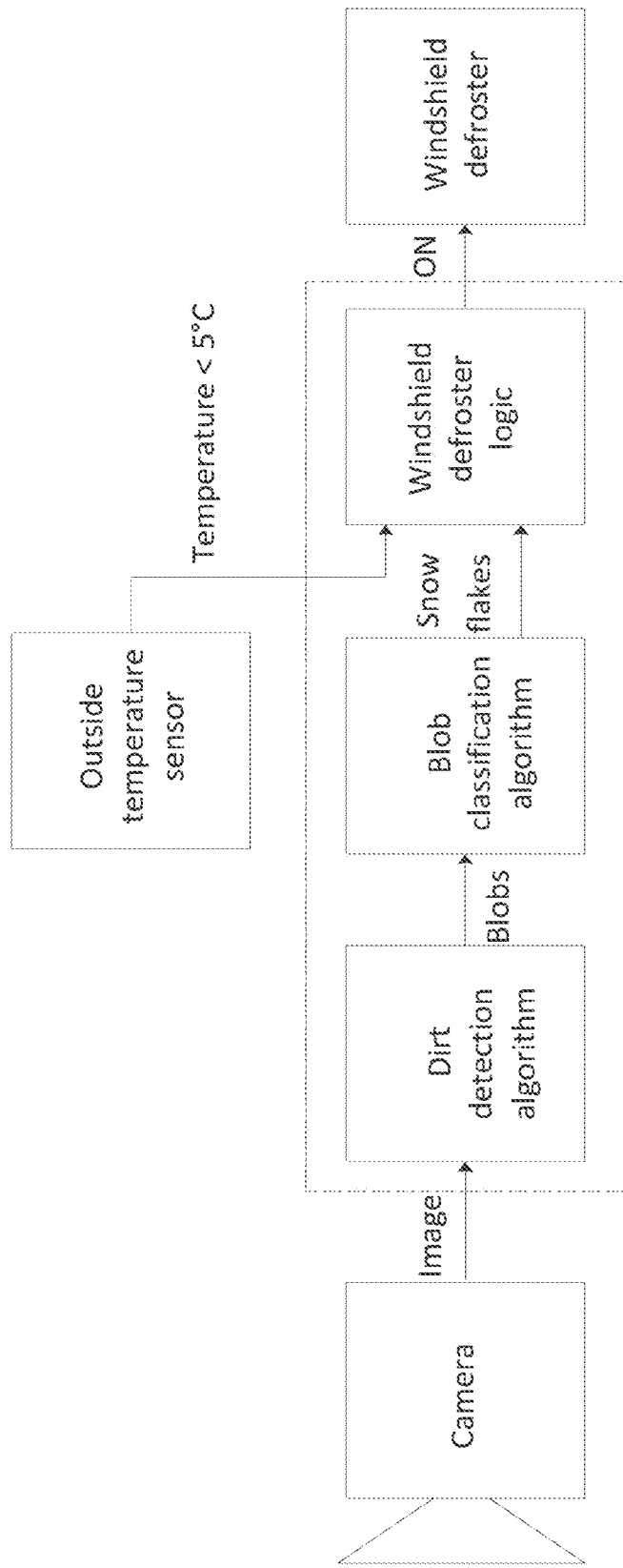
FIG. 7 is a schematic of a dirt detection system and algorithm of the present invention, which processes image data from a vehicle camera and delivers blobs from dirt to a blob classification algorithm which controls a windshield defroster logic to turn to 'ON' when the outside temperature is below about 5 degrees C. at the same time measured by an outside thermometer.

Machine vision algorithms may be enhanced by incorporating the warning or confidence levels of all several or joined dirt detection algorithms as input for further decision making, learning or triggering a function. For example, a road surface classification algorithm may be switched from a "dry road" data set to a "wet road" data set when the dirt detection algorithm detects transparent dirt or the like. There may be additional properties of images of water drops on a camera lens surface. These properties may be analyzed by the image classification algorithm similar to an algorithm for driving scene classification (such as described in U.S. provisional application Ser. No. 61/864,838, filed Aug. 12, 2013, which is hereby incorporated herein by reference in its entirety), but trained on camera (dirt) blob images. The dirt detection algorithm may provide regions of interest to investigate by the classification algorithm, which may come up with a result (confidence level) of which kind of dirt or obstruction may be present, such as by distinguishing snowflakes from rain drops, hail, mud or being under water. A consecutive plausibilization algorithm may take additional measures into account, such as data from an outside temperature sensor. Applications of such a function may be to control the HVAC to close all inlets when there is massive dust in the air outside or to switch the engine's air intake to snorkel when, for example, an off road vehicle enters water or the like, or to turn on the windshield defroster to heating when the dirt detection indicates blobs, and the classifier indicates the presence of snowflakes or the like, and the outside temperature is below a threshold temperature, such as, for example, below about +5 degrees C. or other suitable threshold temperature (see FIG. 7).

In order to reduce this limitation there may be more sophisticated algorithm to use, whereby the algorithm may have areas having a blob of dirt detected be covered by another camera. Typically, just the image of one camera may be displayed within an overlapping zone. The algorithm of the present invention may utilize the whole image of a second camera, the area of the overlapping zone of both cameras or just the fraction of the image of the second camera that encompasses the spot or location encompassed by the portion of the first camera's view that has a dirt spot thereat. Thus, the system is not dependent on a stored fraction of an image, but instead the system utilizes the fraction of the overlapping field of view of another camera captured at the same time (real time).

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (preferably a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or U.S. patent applications, Ser. No. 14/107,624, filed Dec. 16, 2013; Ser. No. 14/102,981, filed Dec. 11, 2013; Ser. No. 14/102,980, filed Dec. 11, 2013; Ser. No. 14/098,817, filed Dec. 6, 2013; Ser. No. 14/097,581, filed Dec. 5, 2013; Ser. No. 14/093,981, filed Dec. 2, 2013; Ser. No. 14/093,980, filed Dec. 2, 2013; Ser. No. 14/082,573, filed Nov. 18, 2013; Ser. No. 14/082,574, filed Nov. 18, 2013; Ser. No. 14/082,575, filed Nov. 18, 2013; Ser. No. 14/082,577, filed Nov. 18, 2013; Ser. No. 14/071,086, filed Nov. 4, 2013; Ser. No. 14/076,524, filed Nov. 11, 2013; Ser. No. 14/052,945, filed Oct. 14, 2013; Ser. No. 14/046,174, filed Oct. 4, 2013; Ser. No. 14/016,790, filed Oct. 3, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013; Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/893,489, filed Oct. 21, 2013; Ser. No. 61/886,883, filed Oct. 4, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/810,407, filed Apr. 10, 2013; Ser. No. 61/808,930, filed Apr. 5, 2013; Ser. No. 61/807,050, filed Apr. 1, 2013; Ser. No. 61/806,674, filed Mar. 29, 2013; Ser. No. 61/793,592, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/760,366, filed Feb. 4, 2013; Ser. No. 61/760,364, filed Feb. 4, 2013; Ser. No. 61/756,832, filed Jan. 25, 2013; and/or Ser. No. 61/754,804, filed Jan. 21, 2013, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454; and 6,824,281, and/or International Publication Nos. WO 2010/099416; WO 2011/028686; and/or WO 2013/016409, and/or U.S. Pat. Publication No. US 2010-0020170, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580; and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149 and/or U.S. Publication No. US-2006-0061008 and/or U.S. patent application Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO2012/075250; WO 2013/019795; WO 2012/075250; WO 2012/145822; WO 2013/081985; WO 2013/086249; and/or WO 2013/109869, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vision system for a vehicle, said vision system comprising:
  a first camera disposed at a vehicle equipped with said vision system, said first camera comprising an image sensor and a lens, wherein, when said first camera is disposed at the equipped vehicle, said lens is exposed to the environment exterior the equipped vehicle;
  wherein said first camera has an exterior field of view exterior the equipped vehicle and is operable to capture image data representative of a scene occurring in the field of view of said first camera;
  an image processor operable to process multiple frames of image data captured by said first camera;
  wherein said image processor is operable to process captured image data to detect blobs in captured image data;
  wherein, responsive to processing detected blob data over multiple frames of captured image data, said image processor determines if detected blobs are representative of contaminants at said lens of said first camera;
  wherein, responsive to processing a first frame of captured image data, and responsive to said image processor determining a first threshold likelihood that a detected blob is indicative of a contaminant, said image processor adjusts processing of detected blob data when processing a subsequent frame of captured image data;
  wherein, responsive to said image processor determining a second threshold likelihood that the detected blob is indicative of a contaminant when processing detected blob data of said subsequent frame of captured image data, said image processor determines that the detected blob is representative of a contaminant at said lens of said first camera;
  wherein, responsive to said image processor determining that the detected blob is representative of a contaminant at said lens, said vision system generates an alert;
  a second camera disposed at the equipped vehicle and having a field of view that at least partially overlaps the field of view of said first camera, wherein said second camera is operable to capture image data representative of a scene occurring in the field of view of said second camera; and
  wherein said image processor is operable to process image data captured by said second camera, and wherein, responsive to processing of captured image data of the overlapping portion of the fields of view of said first camera and said second camera, said image processor is operable to determine the presence of a contaminant at said lens of said first camera.

2. The vision system of claim 1, wherein said vision system, responsive to said image processor determining that the detected blob is representative of a contaminant at said lens, triggers a function.

3. The vision system of claim 2, wherein said function triggered by said vision system comprises cleaning of said lens of said first camera.

4. The vision system of claim 2, wherein said function triggered by said vision system comprises an input for adjusting the processing of at least one consecutive or parallel algorithm or mode.

5. The vision system of claim 1, wherein, responsive to determination that the detected blob is representative of a contaminant, and responsive to an exterior temperature sensor, said vision system is operable to control an HVAC system of the equipped vehicle.

6. The vision system of claim 1, wherein said image processor is operable to adapt image processing of captured image data responsive to a determination of an environment in which the vehicle is being driven.

7. The vision system of claim 1, wherein, after processing multiple frames of captured image data, said vision system compares a stored value to a contrast minimum value to determine if a detected blob is indicative of a contaminant at said lens.

8. The vision system of claim 1, wherein said multiple frames of captured image data comprise at least one of (i) a difference image between two frames of captured image data, (ii) a contrast maximum image and (iii) a color space diagonal distance image.

9. The vision system of claim 1, wherein said image processor is operable to determine contaminants comprising at least water drops and dirt at said lens of said first camera.

10. The vision system of claim 1, wherein said first threshold likelihood is about the same as said second threshold likelihood.

11. The vision system of claim 1, wherein said first and second threshold likelihoods comprise preselected confidence parameters of said vision system.

12. The vision system of claim 1, wherein said first frame of captured image data is processed via a first algorithm that classifies detected blobs as possible contaminants when said image processor determines the first threshold likelihood that the detected blob is indicative of a contaminant.

13. The vision system of claim 12, wherein said subsequent frame of captured image data is processed via a second algorithm to determine if the possible contaminant is within a threshold likelihood of being a contaminant.

14. A vision system for a vehicle, said vision system comprising:
 a first camera disposed at a vehicle equipped with said vision system, said first camera comprising an image sensor and a lens, wherein, when said first camera is disposed at the equipped vehicle, said lens is exposed to the environment exterior the equipped vehicle;
 wherein said first camera has an exterior field of view exterior the equipped vehicle and is operable to capture image data representative of a scene occurring in the field of view of said first camera;
 an image processor operable to process multiple frames of image data captured by said first camera;
 wherein said image processor is operable to process captured image data to detect blobs in captured image data;
 wherein, responsive to processing detected blob data over multiple frames of captured image data, said image processor determines if detected blobs are representative of contaminants at said lens of said first camera;
 wherein, responsive to processing a first frame of captured image data, and responsive to said image processor determining a first threshold likelihood that a detected blob is indicative of a contaminant, said image processor adjusts processing of detected blob data when processing a subsequent frame of captured image data;
 wherein, responsive to said image processor determining a second threshold likelihood that the detected blob is indicative of a contaminant when processing detected blob data of said subsequent frame of captured image data, said image processor determines that the detected blob is representative of a contaminant at said lens of said first camera;
 wherein said first and second threshold likelihoods comprise preselected confidence parameters of said vision system;
 wherein said first frame of captured image data is processed via a first algorithm that classifies detected blobs as possible contaminants when said image processor determines the first threshold likelihood that the detected blob is indicative of a contaminant;
 wherein said subsequent frame of captured image data is processed via a second algorithm to determine if the possible contaminant is within a threshold likelihood of being a contaminant;
 wherein, responsive to said image processor determining that the detected blob is representative of a contaminant at said lens, said vision system generates an alert;
 a second camera disposed at the equipped vehicle and having a field of view that at least partially overlaps the field of view of said first camera, wherein said second camera is operable to capture image data representative of a scene occurring in the field of view of said second camera; and
 wherein said image processor is operable to process image data captured by said second camera, and wherein, responsive to processing of captured image data of the overlapping portion of the fields of view of said first camera and said second camera, said image processor is operable to determine the presence of a contaminant at said lens of said first camera.

15. The vision system of claim 14, wherein, responsive to determination that the detected blob is representative of a contaminant, and responsive to an exterior temperature sensor, said vision system is operable to control an HVAC system of the equipped vehicle.

16. A vision system for a vehicle, said vision system comprising:
 a first camera disposed at a vehicle equipped with said vision system, said first camera comprising an image sensor and a lens, wherein, when said first camera is disposed at the equipped vehicle, said lens is exposed to the environment exterior the equipped vehicle;
 wherein said first camera has an exterior field of view exterior the equipped vehicle and is operable to capture image data representative of a scene occurring in the field of view of said first camera;
 an image processor operable to process multiple frames of image data captured by said first camera;
 wherein said image processor is operable to process captured image data to detect blobs in captured image data;
 wherein, responsive to processing detected blob data over multiple frames of captured image data, said image processor determines if detected blobs are representative of contaminants at said lens of said first camera;
 wherein, responsive to processing a first frame of captured image data, and responsive to said image processor determining a first threshold likelihood that a detected blob is indicative of a contaminant, said image processor adjusts processing of detected blob data when processing a subsequent frame of captured image data;
 wherein, responsive to said image processor determining a second threshold likelihood that the detected blob is indicative of a contaminant when processing detected blob data of said subsequent frame of captured image data, said image processor determines that the detected blob is representative of a contaminant at said lens of said first camera;

wherein said first frame of captured image data is processed via a first algorithm that classifies detected blobs as possible contaminants when said image processor determines the first threshold likelihood that the detected blob is indicative of a contaminant;

wherein said subsequent frame of captured image data is processed via a second algorithm to determine if the possible contaminant is within a threshold likelihood of being a contaminant;

wherein said image processor is operable to detect contaminants comprising water drops and dirt at said lens of said first camera;

wherein, responsive to said image processor determining that the detected blob is representative of a contaminant at said lens, said vision system generates an alert and triggers a function;

a second camera disposed at the equipped vehicle and having a field of view that at least partially overlaps the field of view of said first camera, wherein said second camera is operable to capture image data representative of a scene occurring in the field of view of said second camera; and wherein said image processor is operable to process image data captured by said second camera, and wherein, responsive to processing of captured image data of the overlapping portion of the fields of view of said first camera and said second camera, said image processor is operable to determine the presence of a contaminant at said lens of said first camera.

17. The vision system of claim 16, wherein, responsive to determination that the detected blob is representative of a contaminant, and responsive to an exterior temperature sensor, said vision system is operable to control an HVAC system of the equipped vehicle.

* * * * *